US008321161B1

(12) United States Patent
Bruno et al.

(10) Patent No.: US 8,321,161 B1
(45) Date of Patent: Nov. 27, 2012

(54) AUTONOMOUS MAGNETIC MEASUREMENT SYSTEM

(75) Inventors: Anthony B. Bruno, East Lyme, CT (US); Rolf G. Kasper, Old Lyme, CT (US)

(73) Assignee: The United States of America as represented by the Secretarty of the Navy, Washington, DC (US)

( * ) Notice: Subject to any disclaimer, the term of this patent is extended or adjusted under 35 U.S.C. 154(b) by 312 days.

(21) Appl. No.: 12/884,769

(22) Filed: Sep. 17, 2010

(51) Int. Cl.
*G01C 17/38* (2006.01)

(52) U.S. Cl. ............ 702/57; 702/92; 702/150; 33/355 R; 33/356; 33/361; 701/213; 701/518; 324/347

(58) Field of Classification Search .............. 702/57, 702/92, 150; 33/335 R, 356, 361, 316, 319, 33/357, 326; 701/530, 213, 518; 324/338, 324/347, 345, 226, 202, 244
See application file for complete search history.

(56) References Cited

U.S. PATENT DOCUMENTS

| | | | |
|---|---|---|---|
| 4,807,462 A * | 2/1989 | Al-Attar | 73/1.76 |
| 5,737,226 A * | 4/1998 | Olson et al. | 701/530 |
| 5,850,624 A * | 12/1998 | Gard et al. | 702/92 |
| 6,539,639 B2 * | 4/2003 | Smith | 33/356 |
| 6,962,001 B2 * | 11/2005 | Yano et al. | 33/355 R |
| 7,149,627 B2 * | 12/2006 | Ockerse et al. | 701/530 |
| 7,210,236 B2 * | 5/2007 | Sato et al | 33/356 |
| 7,266,452 B2 * | 9/2007 | Ockerse et al. | 701/530 |
| 7,278,219 B2 * | 10/2007 | Honkura et al. | 33/356 |
| 7,379,814 B2 * | 5/2008 | Ockerse et al. | 701/530 |
| 7,509,748 B2 * | 3/2009 | Xue et al. | 33/356 |
| 2005/0283988 A1* | 12/2005 | Sato et al. | 33/356 |
| 2006/0190174 A1* | 8/2006 | Li et al. | 701/224 |
| 2006/0247847 A1* | 11/2006 | Carter et al. | 701/200 |
| 2006/0288597 A1* | 12/2006 | Parks et al. | 33/356 |
| 2007/0084070 A1* | 4/2007 | Honkura et al. | 33/356 |
| 2007/0101596 A1* | 5/2007 | Olson et al. | 33/356 |
| 2007/0124076 A1* | 5/2007 | Ockerse et al. | 701/224 |
| 2007/0288166 A1* | 12/2007 | Ockerse et al. | 701/224 |

* cited by examiner

*Primary Examiner* — Carol Tsai
(74) *Attorney, Agent, or Firm* — James M. Kasischke; Jean-Paul A. Nasser; Micheal P. Stanley

(57) ABSTRACT

The invention as disclosed is an autonomous magnetic measurement system for monitoring the background magnetic fields associated with power lines, electronic devices, electronic vehicles and the Earth's background magnetic field. The components of the autonomous magnetic measurement system include a series of three axis analog magnetic sensors, a fluxgate compass, and a programmable micro-controller. The micro-controller receives data from the sensor and compass and is programmed to autonomously detect magnetic signals having particular characteristics of interest.

9 Claims, 2 Drawing Sheets

AUTONOMOUS MAGNETIC MEASUREMENT SYSTEM

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention is directed to the measurement of magnetic fields. In particular, the present invention is directed to a sensor system that autonomously monitors both direct current (DC) and alternating current (AC) magnetic fields of electrical devices and electric power transmission.

(2) Description of the Prior Art

Often times it is necessary to measure and monitor magnetic fields. In clean rooms, research facilities and electromagnetic interference and electromagnetic compatibility test chambers, knowledge of local background magnetic fields is critical. It is well known that magnetic fields are associated with electric power transmission lines, house-hold electric appliances and electric vehicles. It is not as well known, however, the natural variability of the magnetic fields associated with the aforementioned transmission lines, appliances and vehicles as well as the associated maximum magnetic fields over specified periods of time within a specified proximity.

SUMMARY OF THE INVENTION

It is a general purpose and object of the present invention to measure, the natural variability of the magnetic fields associated with transmission lines and electric devices as well as the associated maximum magnetic fields over specified periods of time within a specified proximity.

The above object is accomplished with the present invention through the use of an autonomous magnetic measurement system for monitoring the background magnetic fields associated with power lines, electronic devices, electronic vehicles and the Earth's background magnetic field. The components of the autonomous magnetic measurement system include a series of three axis analog magnetic sensors, a fluxgate compass, and a programmable micro-controller. The micro-controller receives data from the sensor and compass and is programmed to autonomously detect magnetic signals having particular characteristics of interest.

BRIEF DESCRIPTION OF THE DRAWINGS

A more complete understanding of the invention and many of the attendant advantages thereto will be more readily appreciated by referring to the following detailed description when considered in conjunction with the accompanying drawings, wherein like reference numerals refer to like parts and wherein.

DETAILED DESCRIPTION OF THE INVENTION

Figure 1:
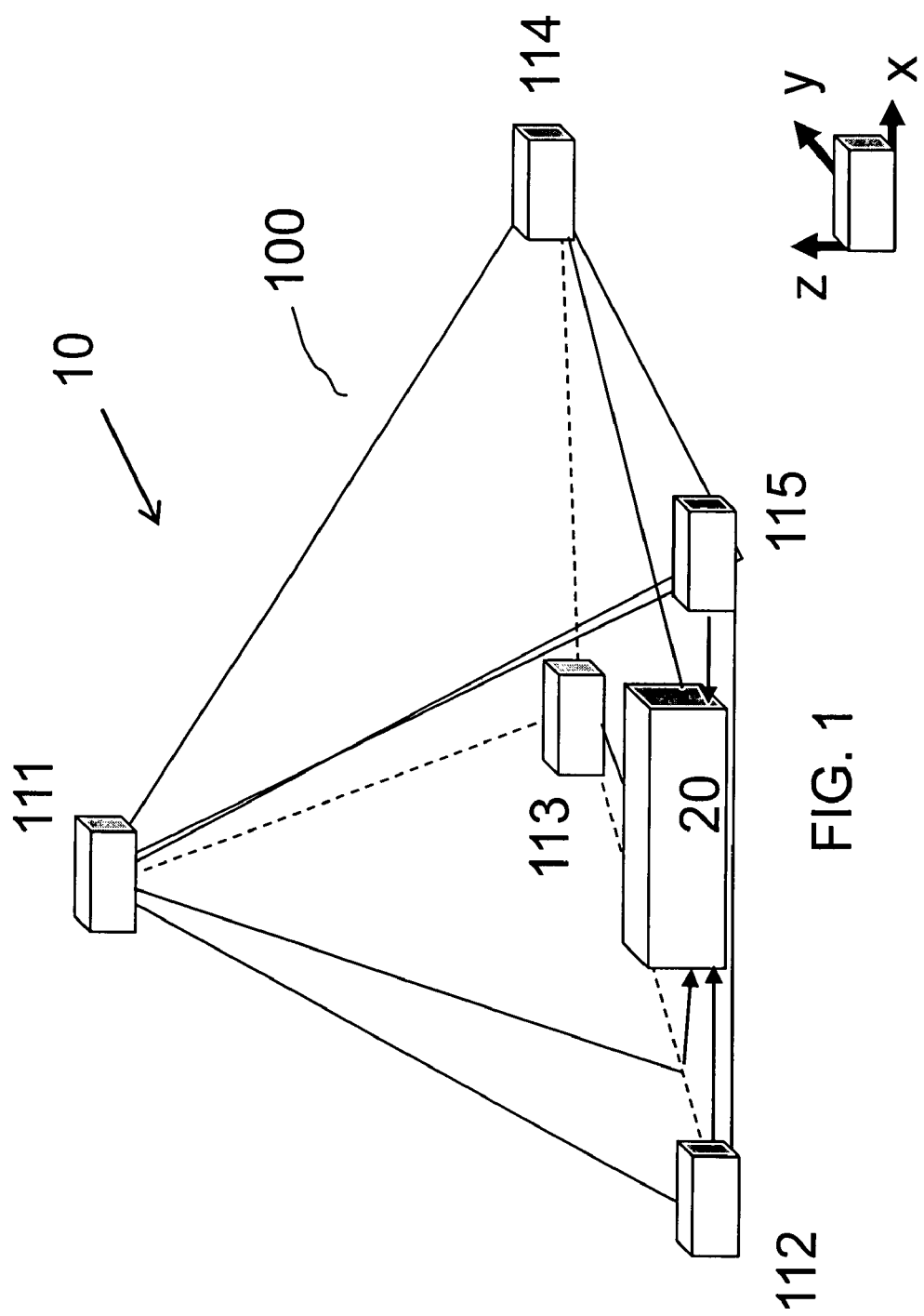
FIG. 1 illustrates the tetrahedral structure supporting the magnetic sensor apparatus and the processor of the autonomous magnetic measurement system of the present invention.

Referring to FIG. 1, there is illustrated the autonomous magnetic measurement system 10 of the present invention. The system 10 is comprised of a tetrahedral structure 100 arranged with five three-axis analog magnetic sensor 111, 112, 113, 114 and 115, one at each of the vertices of the tetrahedral structure 100. The tetrahedral structure 100 provides a physical support for the three axis magnetic sensors 111, 112, 113, 114 and 115 and is constructed of polyethylene or other non-magnetic, dielectric material. Each three axis magnetic sensor 111, 112, 113, 114 and 115 is in communication with a processor 20 where data from each magnetic sensor is interpreted and processed according to the requirements of the particular measurement. In particular each three axis magnetic sensor 111, 112, 113, 114 and 115 can measure both DC and AC magnetic fields, digitize the analog data and communicate the data to the processor 20. The individual three axis magnetic sensors 111, 112, 113, 114 and 115 are aligned such that the x axis of each sensor is parallel to the other sensors, and the z axis of each sensor points in the positive up direction so as to form a right handed system according to convention. This arrangement of magnetic sensors comprises a gradiometer with the magnetic sensors 112, 113, 114, and 115 forming the gradiometer and magnetic sensor 111 serving as the reference sensor. Unlike total field or vector measurements, gradiometers are concerned with the spatial gradient (G) of the magnetic field (B). A simple method to calculate the y direction magnetic field vector ($B_y$) gradient along the y-axis is to have magnetic sensor 112 and 113 measure $B_{y2}$ and $B_{y3}$ at their respective locations. The difference or gradient, $\Delta B_y$, is given by $B_{y3} - B_{y2}$. In the limit, $\Delta B_y$ is given by $$\frac{\partial B_y}{\partial y} = \frac{B_{y3} - B_{y2}}{\Delta y}$$

where $\Delta y$ is the separation between magnetic sensors 112 and 113. The well known gradient field (G) tensor is given by $$G = \begin{vmatrix} \frac{\partial B_x}{\partial x} & \frac{\partial B_x}{\partial y} & \frac{\partial B_x}{\partial z} \\ \frac{\partial B_y}{\partial x} & \frac{\partial B_y}{\partial y} & \frac{\partial B_y}{\partial z} \\ \frac{\partial B_z}{\partial x} & \frac{\partial B_z}{\partial y} & \frac{\partial B_z}{\partial z} \end{vmatrix},$$

is defined by obtaining similar gradients on a common platform with extended magnetic sensor placements as shown in FIG. 1. The advantage of this approach is that the gradient of the Earth's magnetic field is very small ($\approx 0.01$ nT/m), while the gradient of a magnetic source such as a power line would be much greater. This insensitivity to the geomagnetic field makes any close-by magnetic source, more visible. In addition to the noise immunity, measurements of the field gradients also offer a more fine-tuned ability for location and categorization of the magnetic fields under investigation.

Figure 2:
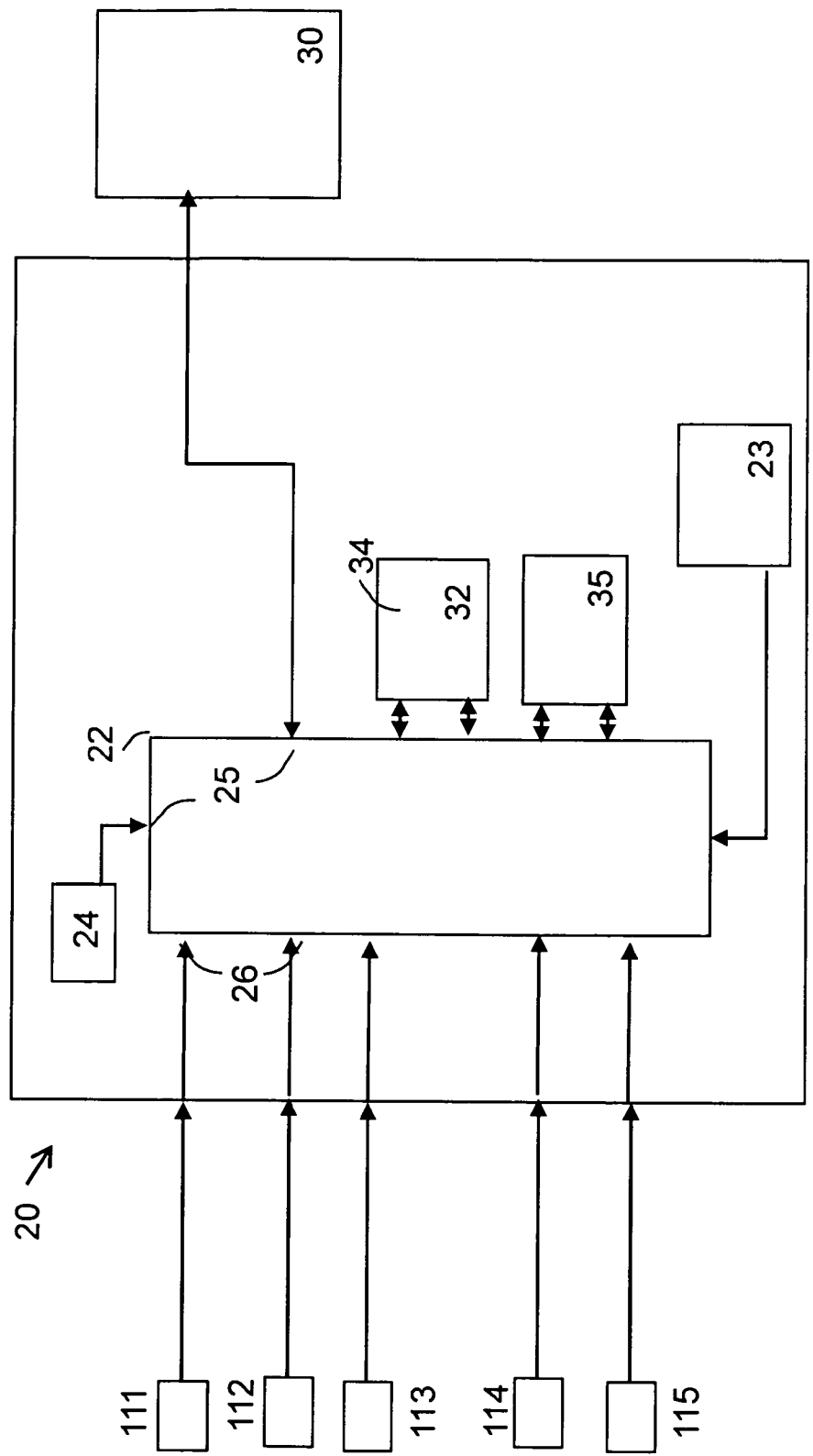
FIG. 2 illustrates the exemplary details of the system components of the autonomous magnetic measurement system of the present invention.

Referring to FIG. 2, there is illustrated a detailed view of the internal components of the processor 20 joined to the magnetic sensors 111, 112, 113, 114 and 115 of the autonomous magnetic field measurement system 10 of the present invention. The processor 20 of the system 10 processes the digital signals from each of the magnetic sensors 112, 113, 114, 115, the reference magnetic sensor 111, and an internal flux gate compass 24 that measures the orientation of the autonomous magnetic field measurement system. The flux gate compass 24 is connected to a micro-controller 22, which functions as a programmable digital processor, via a universal asynchronous receiver transmitter (UART) 25. An electric power source 23 provides direct current power to the autonomous magnetic field measurement system. In a preferred embodiment, the power source 23 is a rechargeable lithium ion battery. The power source is connected to the micro-controller 22 via a standard power connection and distributes power to both the micro-controller 22 and the magnetic sensors 111, 112, 113, 114 and 115. In a preferred embodiment, each three-axis analog magnetic sensor 111, 112, 113, 114 and 115 is a vector magnetic sensor based on the Giant Magneto Impedance (GMI) effect in soft magnetic wires. The GMI effect is observed in permalloy micro-fibers of very small diameter (approximately 30 microns) driven by an AC current resulting in a voltage drop across the fiber proportional to an applied axial magnetic field. Three micro-fibers arranged orthogonally can be formed into a three-axis vector magnetometer. Each GMI magnetometer 111, 112, 113, 114 and 115 is a self contained unit and provides both DC and AC digital magnetic field data to the micro-controller 22 via individual parallel port interfaces (such as RS-232) ports 26. The micro-controller 22 is programmed with embedded analysis software 34. The analysis software 34 is stored on random access memory unit 32, attached to and in direct communication with micro-controller 22. In a preferred embodiment, the analysis software 34 can be varied and tailored to specific applications such as power lines or generators by removing the memory unit 32 and modifying the analysis software 34. The analysis software 34 instructs the micro-controller 22 to constantly receive data from the GMI magnetometers 111, 112, 113, 114 and 115 and fluxgate compass 24, to measure the dynamic magnetic fields of interest and to contrast them to the Earth's magnetic field. In particular, the micro-controller 22 is programmed to measure the natural variability of the magnetic field of an electrical device as well as the maximum magnetic field at different frequencies.

In one example, the autonomous magnetic measurement system 10 of the present invention is used to monitor the magnetic fields generated by power lines, the micro-controller 22 is programmed to monitor and record signals at 60 HZ and related odd or even harmonics. Such odd and even harmonics include signals at 180, 300, 420, 540, (2n−1)*60 HZ for n=1, 2, 3, . . . respectively. The micro-controller recording capability monitors the background field autonomously for a specified period of time such as one week. The relevant magnetic field data of interest is identified and stored in a non-volatile digital memory storage device 35. In a preferred embodiment, the storage device 35 is removable and when storage capacity is reached it can be replaced with another storage device 35.

The magnetic field levels generated by power lines are monitored in the nano-tesla (nT) range. The micro-controller 22 averages the magnetic field levels to derive a composite number for each frequency of interest over a twenty four hour period. The 24 hour day can be divided up into 6, 4 hour periods and the statistical properties of the power line fluctuations can be thus related to various times of the day, e.g., peak power usage might be during the 1600 to 2000 hour block. In this way, power line field levels can be correlated to power usage in a particular area of interest.

In an alternative example the autonomous magnetic measurement system 10 of the present invention can be used to measure the dynamic magnetic fields of an electric device, such as a microwave oven, over a twenty-four hour period. In such an example, the peak magnetic field in nano-teslas (nT) is computed by the micro-controller 22. The peak magnetic field determines the potential exposure of a human being to magnetic fields at a given distance. The autonomous magnetic measurement system 10 will measure the peak field over a specified period of time and can then be moved to a different distance either nearer or closer to the electric device. In addition, at each measurement location the gradient is computed by measuring the difference magnetic field in each direction, e.g., the magnetic gradient in the X direction is $\Delta B_x = (B_{x5} - B_{x2})/\Delta x$ where $B_{x5}$ is the magnetic field in the x direction measured on magnetometer 115 and $B_{x2}$ is the magnetic field in the x direction measured on magnetometer 112. Thus measurements of peak magnetic field and gradient of the magnetic field will completely characterize the behavior of the electric device in question. The analysis software 34 as programmed for the micro-controller 22 of the autonomous magnetic field measurement system measures and instructs the micro-controller to compute the magnetic fields and magnetic field gradients autonomously over a period of time specified by the user.

In both examples as stated above in a preferred embodiment of the present invention, the three axis analog magnetic sensors 111, 112, 113, 114 and 115 are giant magneto impedance (GMI) based vector magnetometers that measure magnetic fields in all directions, continuously and autonomously over the measurement period, as opposed to prior art devices that perform instantaneous measurements in a single direction. The micro-controller 22 is programmed to provide the means to interpret the instantaneous three axis magnetic field data for peak magnetic fields. The three axis analog magnetic sensors 111, 112, 113, 114 and 115 are vector devices that measure the magnetic field in three orthogonal directions and compute the total magnetic field according to $(B_x^2 + B_y^2 + B_z^2)^{1/2}$. In a preferred embodiment, each of the three axis analog magnetic sensors 111, 112, 113, 114 and 115, uses three identical circuits each comprised of a 1 mm length of amorphous ferromagnetic fiber composed primarily of nickel (Ni), cobalt (Co), and Iron (Fe) in a micro-fiber that is approximately thirty microns in diameter and a preamplifier assembled into a three orthogonal axis probe. The micro-fiber exhibits a property known as giant magneto impedance (GMI) where a radio frequency current of a specific frequency is driven down the fiber in the absence of a magnetic field. This establishes baseline impedance or reference impedance. An applied magnetic field varies the micro-fiber impedance and a table of voltage verses applied magnetic field is constructed and where the voltage output of each axis is directly proportional to the applied magnetic field along that axis.

Digital data from each GMI magnetometer 111, 112, 113, 114 and 115 is clocked into the micro-controller 22 for the analysis software 34 that programs the micro-controller 22. The analysis software 34 can be customized to analyze the magnetic field data according to specific applications. In this way magnetic fields in every spatial dimension are measured as well as the total magnetic field for a specified device and frequency.

In an alternative embodiment each GMI magnetometer 111, 112, 113, 114 and 115 and the processor 20 are fabricated on a single integrated circuit chip having multiple interfaces to allow a standard computer 30 to read data directly from the stand alone self contained portion 20 and display the data in a plot or spreadsheet.

The micro-controller 22 is programmed to receive sensor measurements from the three axis analog magnetic sensors 111, 112, 113, 114, and 115 at a continuous sample rate that is application specific depending upon the type of magnetic field of interest. For instance the sample rate for electric power lines is 1 kHz. The micro-controller 22 is programmed to sample at a specified rate for a specified period of time such as one week to measure both the background magnetic field and a specific magnetic field. During that period, the micro-controller 22 is programmed to record only magnetic fields associated with a particular frequency related to the electrical apparatus in question.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. An autonomous magnetic field measurement system comprising:
    a tetrahedral structure constructed of a non-magnetic, dielectric material;
    a plurality of three axis magnetic sensors joined to the vertices of the tetrahedral structure, wherein each three axis magnetic sensor generates a plurality of data signals pertaining to a proximate surrounding magnetic field in three orthogonal directions and a total magnetic field according to $(B_x^2+B_y^2+B_z^2)^{1/2}$;
    a flux gate compass that generates a plurality of data signals pertaining to the spatial orientation of the autonomous magnetic field measurement system;
    a micro-controller connected to the flux gate compass and the plurality of three axis magnetic sensors that receives and processes the plurality of data signals generated by the flux gate compass and the plurality of three axis magnetic sensors to derive a plurality of magnetic field data for at least one frequency of interest over a specified period of time;
    a memory unit, connected to the micro-controller, containing an analysis software that instructs the micro-controller in the method of processing the plurality of data signals generated by the flux gate compass and the plurality of three axis magnetic sensors;
    a non-volatile digital memory storage device connected to the micro-controller that stores the plurality of magnetic field data derived by the micro-controller; and
    an electric power source electrically connected to the flux gate compass, the plurality of three axis magnetic sensors, the micro-controller, the memory unit and the non-volatile digital memory storage device to provide direct current power to the autonomous magnetic field measurement system.

2. The autonomous magnetic field measurement system of claim 1 wherein the flux gate compass and the micro-controller are electrically connected across a universal asynchronous receiver transmitter.

3. The autonomous magnetic field measurement system of claim 1 wherein the plurality of three axis magnetic sensors and the micro-controller are electrically connected across a parallel port interface port such that the micro-controller can receive both direct current and alternating current digital magnetic field data from the plurality of three axis magnetic sensors.

4. The autonomous magnetic field measurement system of claim 1 wherein the plurality of three axis magnetic sensors are aligned such that the x axis of each sensor is parallel to the other sensor and the z axis of each sensor points in the positive up direction.

5. The autonomous magnetic field measurement system of claim 1 wherein all but one of the plurality of three axis magnetic sensors as arranged on the tetrahedral structure function as a gradiometer while the remaining one of the three axis magnetic sensors functions as a reference sensor.

6. The autonomous magnetic field measurement system of claim 1 wherein the analysis software is capable of being tailored to measurements of specific types of magnetic fields by removing the memory unit and reprogramming the analysis software.

7. The autonomous magnetic field measurement system of claim 1 wherein each of the plurality of three axis magnetic sensors uses three identical circuits each comprised of a 1 mm amorphous ferromagnetic fibers composed primarily of nickel (Ni), cobalt (Co), and Iron (Fe) in a micro-fiber that is approximately thirty microns in diameter and a preamplifier assembled into a three orthogonal axis probe, wherein the micro-fiber exhibits giant magneto impedance such that the voltage output of the three axis analog magnetic sensor is directly proportional to the magnetic field in all directions.

8. The autonomous magnetic field measurement system of claim 1 wherein the plurality of three axis magnetic sensors, the flux gate compass and the micro-controller are fabricated on a single integrated circuit chip having a plurality of interfaces to allow a standard computer to read a plurality of data directly from the micro-controller and display the plurality of data in a plot or spreadsheet.

9. A method for measuring dynamic magnetic fields through an autonomous magnetic field measurement system comprising:
    arranging a plurality of three axis magnetic sensors on a tetrahedral structure with a flux gate compass, and electrically connecting the sensors and compass to a micro-controller at a specified distance from an electrical source of magnetic fields;
    receiving a continuous plurality of magnetic field data generated from the plurality of three axis magnetic sensors, with the micro-controller;
    receiving a continuous plurality of spatial orientation data from the flux gate compass with the micro-controller;
    measuring a plurality of dynamic magnetic fields having a predetermined specified frequency of interest at a predetermined specified sample rate for a predetermined specified period of time, including a natural variability of said plurality of dynamic magnetic fields and a maximum magnetic field value with the micro-controller using the continuous plurality of magnetic data and plurality of spatial orientation data;
    contrasting the plurality of dynamic magnetic fields at predetermined specified frequencies of interest relative to the Earth's magnetic field with the micro-controller; and
    storing the direct measurements and relative measurements in a non-volatile digital memory storage device connected to the micro-controller.

* * * * *